(12) United States Patent
Martinak et al.

(10) Patent No.: US 9,422,059 B2
(45) Date of Patent: Aug. 23, 2016

(54) VEHICLE SEAT

(71) Applicant: JOHNSON CONTROLS GMBH, Burscheid (DE)

(72) Inventors: Jozef Martinak, Dolné Vestenice (SK); Slawomir Kostrzab, Wrocanka (PL)

(73) Assignee: JOHNSON CONTROLS GMBH, Burscheid (DE)

( * ) Notice: Subject to any disclaimer, the term of this patent is extended or adjusted under 35 U.S.C. 154(b) by 19 days.

(21) Appl. No.: 14/395,179

(22) PCT Filed: Jun. 20, 2013

(86) PCT No.: PCT/EP2013/062904
§ 371 (c)(1),
(2) Date: Oct. 17, 2014

(87) PCT Pub. No.: WO2014/001194
PCT Pub. Date: Jan. 3, 2014

(65) Prior Publication Data
US 2015/0115668 A1    Apr. 30, 2015

(30) Foreign Application Priority Data
Jun. 26, 2012  (DE) .......... 10 2012 012 850

(51) Int. Cl.
*B60N 2/64* (2006.01)
*B64D 11/06* (2006.01)
*B60N 3/00* (2006.01)
*A47B 83/02* (2006.01)

(52) U.S. Cl.
CPC ............ *B64D 11/0638* (2014.12); *A47B 83/02* (2013.01); *B60N 2/64* (2013.01); *B60N 3/001* (2013.01); *B60N 3/004* (2013.01)

(58) Field of Classification Search
CPC ............................ B64D 11/0638; B60N 3/004
USPC ........................................................... 297/163
See application file for complete search history.

(56) References Cited

U.S. PATENT DOCUMENTS

| 5,857,740 | A | * | 1/1999 | Duboulet | ............... | B60N 3/004 297/163 |
|---|---|---|---|---|---|---|
| 6,279,992 | B1 | * | 8/2001 | Plocher | .................. | B60N 3/004 108/44 |
| 7,651,160 | B2 | * | 1/2010 | Okumura | ............... | B60N 3/004 108/42 |
| 2004/0239155 | A1 | * | 12/2004 | Fourrey | ................. | B60N 2/206 297/163 |
| 2006/0214479 | A1 | * | 9/2006 | Dwire | .................... | B60N 3/004 297/163 |
| 2010/0133857 | A1 | | 6/2010 | Kim et al. | | |
| 2011/0121617 | A1 | * | 5/2011 | Beyer | ..................... | B60N 3/004 297/163 |
| 2011/0187163 | A1 | * | 8/2011 | Westerink | .............. | B60N 3/004 297/163 |

(Continued)

FOREIGN PATENT DOCUMENTS

DE    82 31 127 U1    2/1983
DE    32 27 976 A1    2/1984

(Continued)

*Primary Examiner* — Timothy J Brindley
(74) *Attorney, Agent, or Firm* — McGlew and Tuttle, P.C.

(57) ABSTRACT

A vehicle seat (1) includes a backrest (10) and a table unit (40) which is pivotable about a pivot axis (S) from a not-in-use position into a use position. The backrest (10) includes a backrest cover (20), to which the table unit (40) is fastened. A prestressed table spring (34) is provided. The table unit (40) is held on the backrest (10) by a spring force applied by the table spring (34). The table spring (34) is arranged on a side of the backrest cover (20) which faces away from the table unit (40).

11 Claims, 3 Drawing Sheets

(56) References Cited

U.S. PATENT DOCUMENTS

| | | | |
|---|---|---|---|
| 2011/0316311 A1* | 12/2011 | Westerink | B60N 2/4876 297/163 |
| 2012/0091764 A1* | 4/2012 | Cailleteau | B60N 2/0224 297/162 |
| 2012/0204771 A1* | 8/2012 | Fukuhara | A47B 5/04 108/134 |
| 2012/0212012 A1* | 8/2012 | Berger | B64D 11/0015 297/163 |
| 2014/0077533 A1* | 3/2014 | Shih | B60N 3/004 297/163 |

FOREIGN PATENT DOCUMENTS

| | | |
|---|---|---|
| DE | 4 126 427 C1 | 11/1992 |
| DE | 10 2007 001 962 A1 | 7/2008 |
| DE | 10 2008 057 790 A1 | 5/2010 |
| EP | 0 071 817 A1 | 2/1983 |
| FR | 2 831 496 A1 | 5/2003 |
| JP | S60-148136 U | 10/1985 |
| JP | S61-1443 U | 1/1986 |
| JP | 7-55150 Y2 | 12/1995 |
| JP | 2000-052832 A | 2/2000 |
| JP | 2003-320885 A | 11/2003 |

* cited by examiner

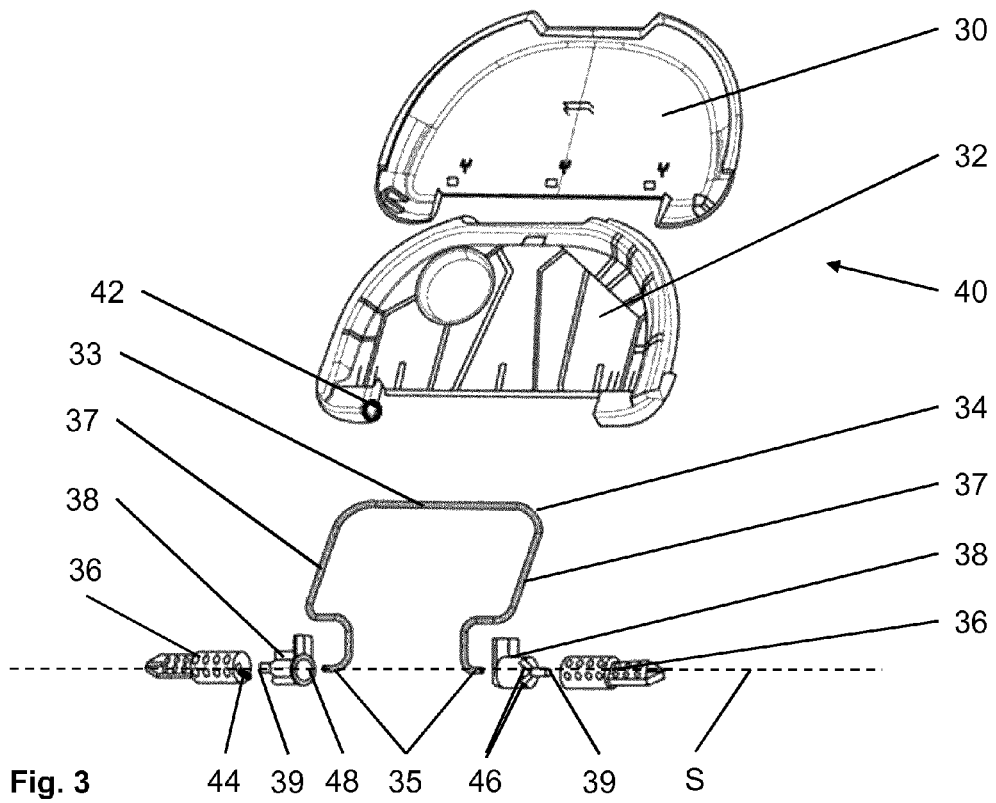
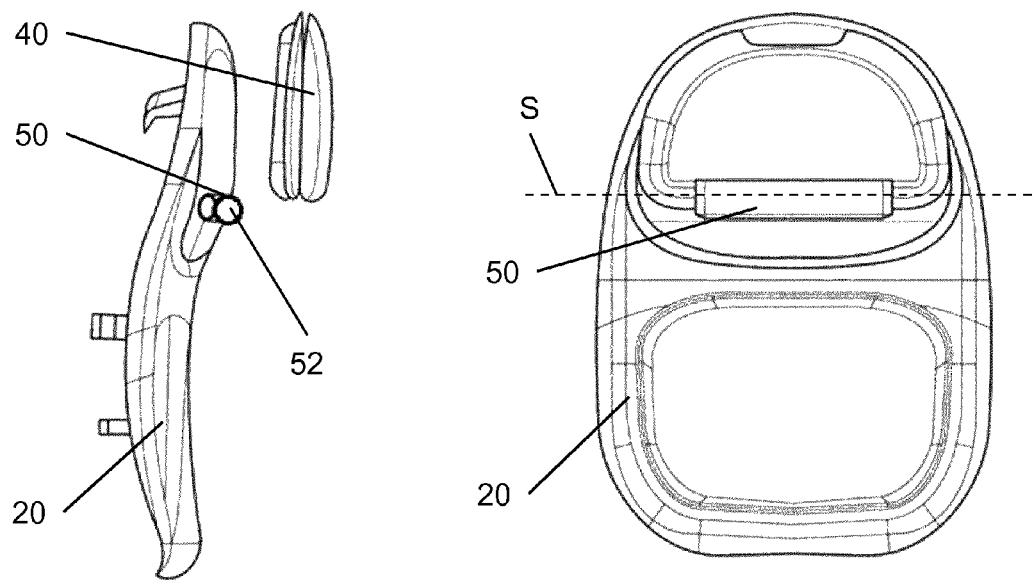
Fig. 3
Fig. 4
Fig. 5

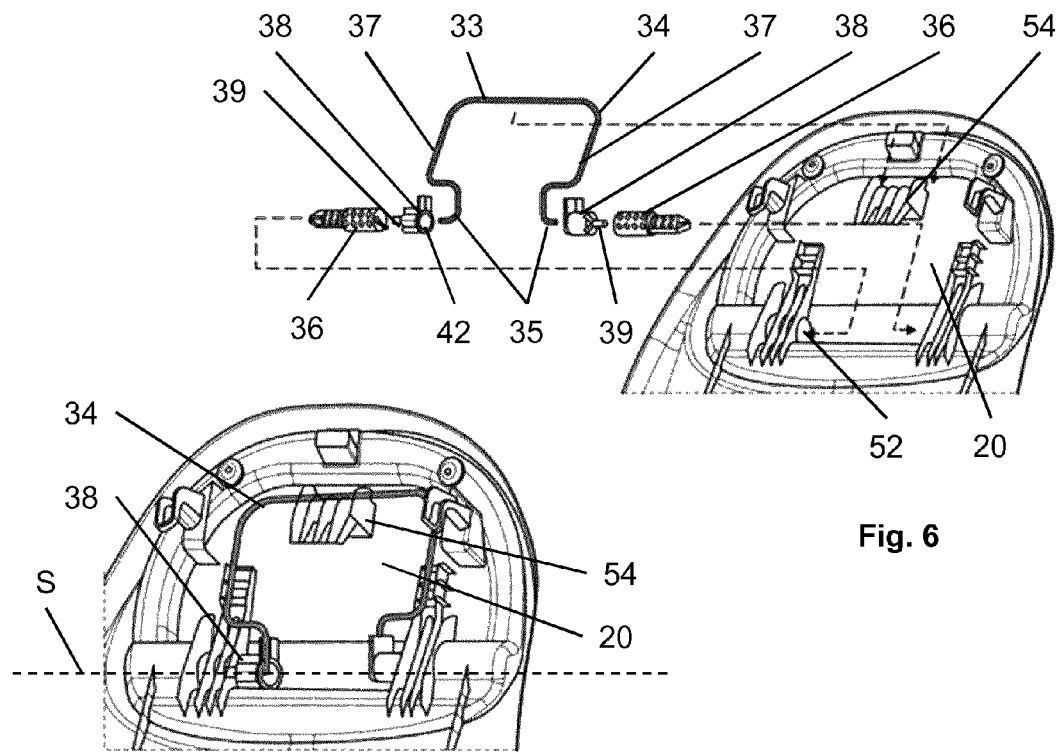
Fig. 6
Fig. 7
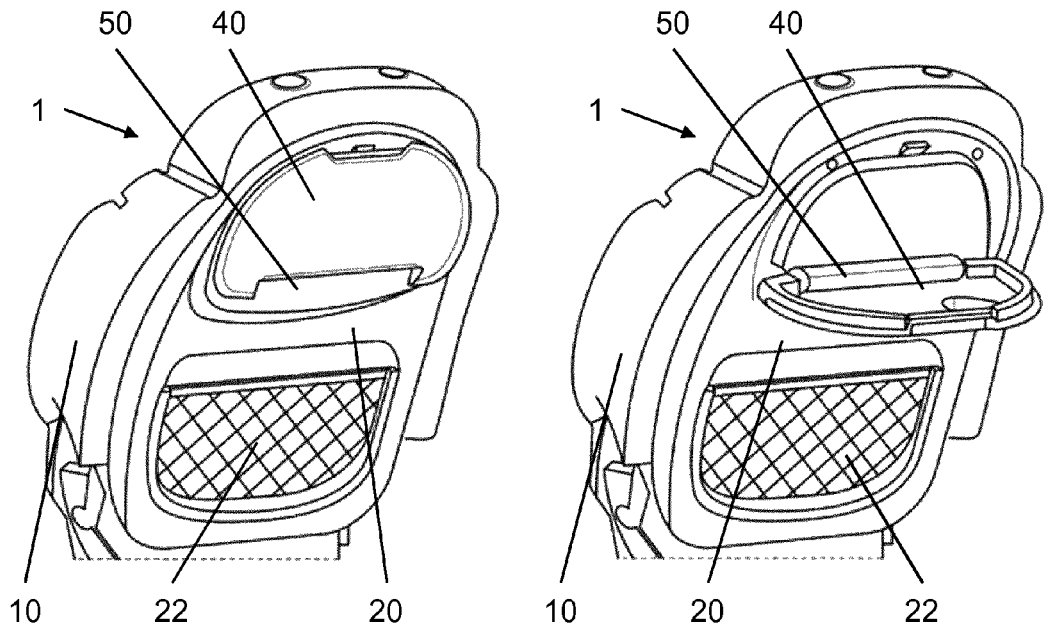
Fig. 8
Fig. 9

VEHICLE SEAT

CROSS REFERENCE TO RELATED APPLICATIONS

This application is a United States National Phase Application of International Application PCT/EP2013/062904 filed Jun. 20, 2013 and claims the benefit of priority under 35 U.S.C. §119 of German Patent Application DE 10 2012 012 850.9 filed Jun. 26, 2012, the entire contents of which are incorporated herein by reference.

FIELD OF THE INVENTION

The invention relates to a vehicle seat having a backrest and having a table unit fastened thereto, which table unit is pivotable about a pivot axis from a non-usage position into a usage position, wherein the backrest comprises a backrest faceplate to which the table unit is fastened.

BACKGROUND OF THE INVENTION

DE 10 2007 001 962 A1 has disclosed a generic vehicle seat, in particular a motor vehicle seat and aircraft seat, having a table unit. In this case, the table unit is attached to the rear side of the backrest of the vehicle seat and provides a surface onto which a vehicle occupant seated on a seat situated behind the vehicle seat can place articles, for example beverages.

The table unit is mounted on the vehicle seat surface to be pivotable about an axis, which runs in a transverse direction, from a folded-up non-usage position into a folded-down usage position. The vehicle occupant can move the table unit manually from the usage position into the non-usage position and in the opposite direction. A table bearing unit with a coupling gear makes it possible for the table unit to be moved independently of the position of the backrest.

DE 10 2008 057 790 A1 has also disclosed a generic vehicle seat having a table unit which is mounted on the vehicle seat surface so as to be pivotable about an axis, which runs in a transverse direction, from a folded-up non-usage position into a folded-down usage position.

DE 82 31 127 U1 also discloses a vehicle seat having a foldable table unit.

SUMMARY OF THE INVENTION

The invention is based on the problem of specifying a vehicle seat of the type mentioned in the introduction which is of simplified construction, and in particular of simplifying the fastening of the table unit to the vehicle seat.

A vehicle seat according to the invention comprises a backrest and a table unit which is pivotable about a pivot axis from a non-usage position into a usage position, and a backrest faceplate to which the table unit is fastened. According to the invention, a table spring is provided which is under preload, wherein the table unit is held on the backrest by a spring force imparted by the table spring, and wherein the table spring is arranged on that side of the backrest faceplate which faces away from the table unit.

In this way, it is possible for the table unit to be mounted on the backrest of the vehicle seat without additional mounting materials, such as for example screws, and without a welding process. The mounting of the table unit is thus advantageously simplified.

Furthermore, it is possible for the table unit to be premounted on the backrest faceplate, and for merely the backrest faceplate to be attached to the backrest during the final assembly process.

Here, the table spring is arranged in the interior of the backrest and is concealed by the backrest faceplate.

Here, it is advantageously the case that the table unit locks in the usage position and/or in the non-usage position under the action of the spring force imparted by the table spring.

In one refinement of the invention, two rotary journals are provided which are connected rotationally conjointly to the table unit, wherein the central axes of the rotary journals are in alignment with the pivot axis.

Here, the backrest faceplate advantageously has a cylindrical protuberance, wherein the rotary journals are situated partially within the protuberance and project into the table unit.

Here, the protuberance is preferably arranged such that the cylinder axis of the protuberance is in alignment with the pivot axis.

In one advantageous refinement of the invention, two table spring sleeves are provided which have in each case one pin-like projection which is in alignment with the pivot axis and which projects into an opening of a rotary journal. Here, the table spring forces the table spring sleeves in the direction of the rotary journals.

Here, the table spring sleeves are connected rotationally conjointly to the table spring and to the backrest faceplate.

It is preferably the case that the table spring is bent approximately in a U-shape and has a central leg and two side legs with spring ends additionally bent outward. Here, the spring ends engage into engagement openings of the table spring sleeves. The mounting of the table unit on the backrest, or on the backrest faceplate, is further simplified by means of this embodiment of the table spring.

Here, the backrest faceplate is preferably composed of plastic.

In one advantageous refinement of the invention, the table unit comprises a table faceplate and a table panel which are joined together in positively locking fashion.

Additional fixing of the table unit to the backrest faceplate is possible if a locking button is attached to the backrest faceplate, which locking button holds the table unit on the backrest faceplate when said table unit is in the non-usage position.

The invention will be explained in more detail below on the basis of an advantageous exemplary embodiment illustrated in the drawings. The invention is however not restricted to said exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is an exploded drawing of a table unit with fastening means;

FIG. 4 is a side view of a backrest faceplate having a table unit for the mounting process;

FIG. 5 is the backrest faceplate from FIG. 4 with table unit mounted thereon;

FIG. 6 is an exploded drawing of the fastening means on the backrest faceplate;

FIG. 7 is the backrest faceplate from FIG. 6 with fastening means mounted thereon;

FIG. 8 is a perspective illustration of a vehicle seat with a table unit situated in the non-usage position; and FIG. 9 is a perspective illustration of a vehicle seat with a table unit situated in the usage position.

DESCRIPTION OF THE PREFERRED EMBODIMENTS

Figure 1:
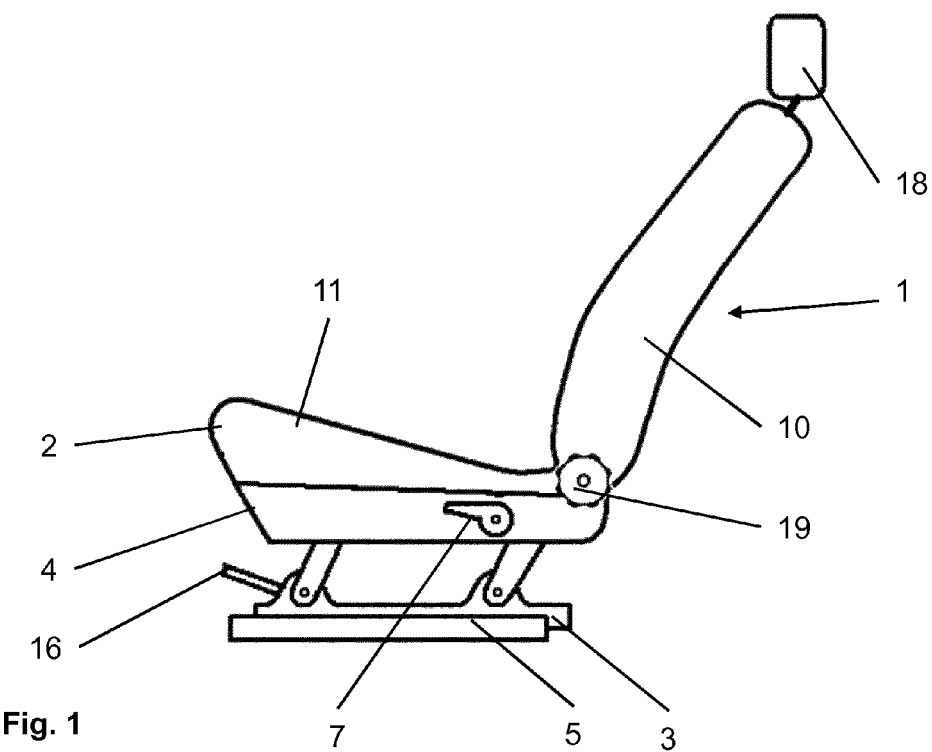
FIG. 1 is a schematic illustration of a vehicle seat.
Figure 2:
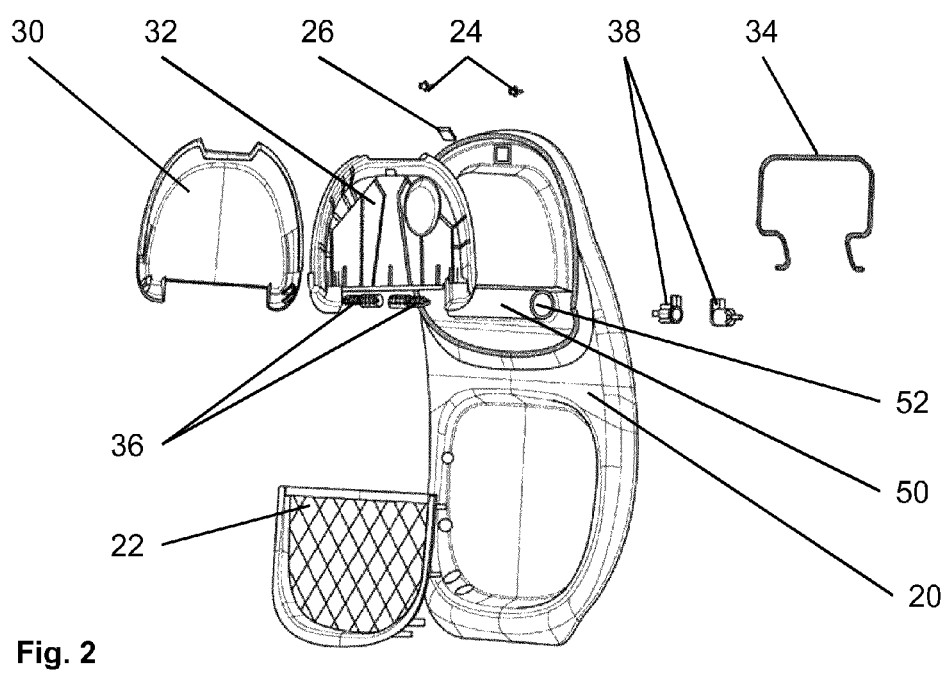
FIG. 2 is an exploded drawing of a table unit on a backrest faceplate.

Referring to the drawings in particular, a vehicle seat 1 for a motor vehicle has a seat part 2, which comprises a seat frame 4, and a backrest 10 which is attached to said seat part and which is adjustable in terms of inclination.

The arrangement of the vehicle seat 1 within the vehicle and the normal direction of travel of said vehicle define the directional terms used below. Here, a direction oriented perpendicular to the ground will hereinafter be referred to as vertical direction, and a direction perpendicular to the vertical direction and perpendicular to the direction of travel will hereinafter be referred to as transverse direction.

By means of a laterally arranged, manually operated backrest adjustment fitting 19, the backrest 10 can be adjusted in terms of inclination, that is to say the angle between the seat part 2 and the backrest 10 is adjustable. Alternatively, an electric drive is also conceivable.

By means of a height adjuster, the height of the seat part 2, and in the present case at the same time that of the backrest 10 of the vehicle seat 1, above the vehicle floor can be adjusted. In the present case, a manually operated drive device 7 is provided for the drive of the height adjuster. Alternatively, an electric drive is also conceivable.

By means of a longitudinal adjuster which has two lower rails 5 connected to the vehicle floor and two upper rails 3 connected to the vehicle seat 1, the vehicle seat 1 can be adjusted longitudinally, that is to say the seat part 2 together with the backrest 10 can be adjusted in the longitudinal direction, which corresponds approximately to the direction of travel. For this purpose, each of the upper rails 3 is guided displaceably in a respective one of the lower rails 5 running parallel in the longitudinal direction and can be locked to the respective lower rail 5 by means of a locking device. The locking device can be unlocked by means of an unlocking bar 16. Alternatively, an electric drive is also conceivable here.

Here, the longitudinal direction runs perpendicular to the transverse direction, but in this case is inclined slightly relative to the direction of travel, and is thus also approximately perpendicular to the vertical direction.

The seat part 2 furthermore comprises a seat cushion 11 which is in the form of a foam part. The backrest 10 is also padded with a foam part and, like the seat cushion 11, is lined with a lining. The seat cushion 11 and the foam part of the backrest 10 considerably increase the seat comfort for an occupant of the vehicle seat 1.

A headrest 18 which is adjustable in terms of height and adjustable in terms of inclination is furthermore attached to the upper end of the backrest 10 in the vertical direction, said upper end being remote from the seat part 2.

The backrest 10 comprises a backrest faceplate 20 which, in the present case, is composed of plastic. The backrest faceplate 20 in the present case completely covers the rear side of the backrest 10, that is to say the rear part of the backrest 10 as viewed in the direction of travel.

A table unit 40 is attached to the backrest faceplate 20. Here, the table unit 40 is pivotable about a pivot axis S, which runs horizontally in the transverse direction, from a non-usage position into a usage position. In the non-usage position, the table unit 40 lies flat against the backrest faceplate 20, and in the usage position, the table unit 40 projects approximately perpendicularly from the backrest faceplate 20. In the usage position, the table unit 40 is oriented such that its surface is oriented approximately horizontally, that is to say parallel to the ground.

A backrest net 22 is also provided on the backrest 20. In the present case, the backrest net 22 is arranged below the table unit 40 and serves for the stowage of articles.

The table unit 40 comprises a table faceplate 30 and a table panel 32. In the non-usage position, the table panel 32 bears against the backrest faceplate 20, and the table faceplate 30 is visible to the rear. In the usage position, the table faceplate 30 points downward, whereas the table panel 32 points upward and articles can be placed thereon.

The table panel 32 and the table faceplate 30 are joined together in positively locking fashion. For this purpose, the table panel 32 has, on its side facing toward the table faceplate 30, multiple hooks by means of which said table panel is connected to the table faceplate 30. The table faceplate 30 has corresponding counterpart elements which, for fastening purposes, interact with the hooks of the table panel 32.

The backrest faceplate 20 has, on its rearwardly facing surface, a cylindrical protuberance 50. The cylindrical protuberance 50 is in this case oriented such that its cylinder axis runs horizontally and is in alignment with the pivot axis S of the table unit 40.

The face sides of the cylindrical protuberance 50 are open and form faceplate openings 52, the central points of which lie on the pivot axis S of the table unit 40. The table unit 40 has two circular bearing openings 42, the central points of which likewise lie on the pivot axis S of the table unit 40. Here, each bearing opening 42 is arranged directly adjacent and parallel to a faceplate opening 52.

In the transverse direction, therefore, the protuberance 50 is situated centrally and is delimited to the outside by the faceplate openings 52. The faceplate openings 52 and the protuberance 50 are engaged over at the outside by the two bearing openings 42 of the table unit 40.

The table unit 40 is fastened pivotably to the backrest faceplate 20 by fastening means which also define the pivot axis S. The fastening means include two rotary journals 36, two table spring sleeves 38 and a table spring 34.

The rotary journals 36 are situated partially within the protuberance 50. Here, each rotary journal 36 extends through a faceplate opening 52 and projects through a bearing opening 42 into the table unit 40. The rotary journals 36 are of approximately cylindrical form and are arranged such that their central axes are in alignment with the pivot axis S.

On the respective side of the rotary journals 36 facing away from the table unit 40, that is to say at the inside in the transverse direction, there are arranged two table spring sleeves 38. Each table spring sleeve 38 is in this case connected in positively locking fashion to a rotary journal 36. For this purpose, each table spring sleeve 38 has, in the present case, a pin-like projection 39 which is in alignment with the pivot axis S and which projects into a cylindrical opening on the face side of the associated rotary journal 36. On that side of the table spring sleeve 38 which faces away from the rotary journal 36, that is to say at the inside in the transverse direction, each table spring sleeve 38 has an engagement opening 48 into which the table spring 34 engages.

The table spring 34 is bent approximately in a U-shape and has a central leg 33 and two side legs 37. Those spring ends 35 of the side legs 37 which are remote from the central leg 33 are additionally bent outward. The table spring 34 is situated between the two table spring sleeves 38, that is to say at the inside in the transverse direction. The central leg 33 of the table spring 34 is fixed in positively locking fashion to a faceplate hook 54 of the backrest faceplate 20. The spring ends 35 engage into the said engagement openings 48 of the table spring sleeves 38.

In the assembly process, the table panel 32 and the table faceplate 30 are firstly connected to form the table unit 40. Subsequently, the table unit 40 is positioned on the backrest faceplate 20 such that the bearing openings 42 are situated adjacent to the faceplate openings 52, and the cylinder axis of the protuberance 50 runs through the central points of the bearing openings 42.

Subsequently, the rotary journals 36, on that side of the backrest faceplate 20 which faces away from the table unit 40, are placed into the protuberance 50 and pushed outward in the transverse direction through the faceplate openings 52 and the bearing openings 42 into the table unit 40. The table unit 40 is now connected to the backrest faceplate 20 and is pivotable relative to the backrest faceplate 40 about the pivot axis S defined by the rotary journals 36.

The rotary journals 36 are now connected in positively locking and rotationally conjoint fashion to the table unit 40.

Subsequently, the table spring sleeves 38, on that side of the backrest faceplate 20 which faces away from the table unit 40, are placed into the protuberance 50 and pushed outward in the transverse direction toward the rotary journals 36. The pin-like projections 39 of the table spring sleeves 38 subsequently engage into the rotary journals 36.

Subsequently, the central leg 33 of the table spring 34 is hooked onto and fastened to the faceplate hook 54 of the back rest faceplate element 20. The faceplate hook 54 is in this case situated on that side of the backrest faceplate 20 which faces away from the table unit 40.

Subsequently, the outwardly bent spring ends 35 of the table spring 34 are inserted into the corresponding engagement openings 48 of the table spring sleeves 38. Owing to the preload of the table spring 34, the side legs 37 of the table spring 34 push the spring ends 35 outward and thus force the table spring sleeves 38 outward in the transverse direction. The table spring sleeves 38 are thereby connected in positively locking and rotationally conjoint fashion to the table spring 34 and to the backrest faceplate 20.

The table spring sleeves 38 thus push outward in the transverse direction against the rotary journals 36 and press these into the table unit 40. In this way, the table unit 40 is fastened to the backrest faceplate 20 of the backrest 10 and is held on the backrest faceplate 20 of the backrest 10 by means of the spring force imparted by the table spring 34. When the table unit 40 is pivoted relative to the backrest faceplate 20, the rotary journals 36 also pivot by the same angle relative to the table spring sleeves 38.

In the present case, each rotary journal 36 additionally has, on its face side facing toward the table spring sleeve 38, a cam 44. Each table spring sleeve 38 has, on its face side facing toward the corresponding rotary journal 36, two locking depressions 46 which are arranged offset with respect to one another by approximately 80°. The cams 44 and the locking depressions 46 are situated eccentrically with respect to the pivot axis S and are at the same radial distance from the pivot axis S. The cams 44 can thus engage into the locking depressions 46.

The cams 44 and the locking depressions 46 are arranged such that, when the table unit 40 is situated in the usage position, the cams 44 engage into two locking depressions 46. When the table unit 40 is situated in the non-usage position, the cams engage into the two other locking depressions 46. In the usage position, and in the non-usage position, the table spring 34 pushes the table spring sleeves 38 against the rotary journals 36, whereby the cams 44 are in each case pushed into locking depressions 46. The usage position and also the non-usage position of the table unit 40 are defined in this way.

During a pivoting movement of the table unit 40 from the non-usage position into the usage position and from the usage position into the non-usage position, therefore, it is initially necessary to overcome the spring force which is imparted by the table spring 34 and which presses the table spring sleeves 38 against the rotary journals 36. The table unit 40 automatically locks in the usage position and in the non-usage position under the action of the spring force imparted by the table spring 34 and owing to the interaction of the cams 44 with the locking depressions 46.

On the backrest faceplate 20, there are also provided two stop dampers 24 composed of a soft, elastic material, in the present case rubber, against which stop dampers the table unit 40 abuts when it reaches the non-usage position, and which stop dampers dampen an impact of the table unit 40 against the backrest faceplate 20. For additional fixing of the table unit 40 in the non-usage position, a locking button 26 is attached to the backrest faceplate 20, which locking button holds the table unit 40 against the backrest faceplate 20.

The features disclosed in the above description, in the claims and in the drawings may both individually and also in combination be of importance for the realization of the invention in its various embodiments.

While specific embodiments of the invention have been shown and described in detail to illustrate the application of the principles of the invention, it will be understood that the invention may be embodied otherwise without departing from such principles.

The invention claimed is:

1. A vehicle seat comprising:
a backrest comprising a backrest faceplate;
a table unit pivotable about a pivot axis from a non-usage position into a usage position, the table unit being fastened to the backrest faceplate;
two rotary journals connected rotationally to the table unit;
two table spring sleeves, each provided with one pin-like projection, which is in alignment with the pivot axis; and
a table spring under preload, wherein:
the table unit is held on the backrest by a spring force imparted by the table spring;
the table spring is arranged on a side of the backrest faceplate which faces away from the table unit;
the projections project into a respective rotary journal opening;
the table spring forces the table spring sleeves in a direction of the rotary journals; and
the table spring sleeves are connected rotationally to the table spring and to the backrest faceplate.

2. A vehicle seat as claimed in claim 1, wherein the table unit locks in the usage position under the action of spring force imparted by the table spring.

3. A vehicle seat as claimed in claim 1, wherein the table unit locks in the non-usage position under the action of spring force imparted by the table spring.

4. A vehicle seat as claimed in claim 1, wherein the central axes of the rotary journals are in alignment with the pivot axis.

5. A vehicle seat as claimed in claim 1, wherein the backrest faceplate has a cylindrical protuberance.

6. A vehicle seat as claimed in claim 5, wherein the rotary journals are situated partially within the protuberance and project into the table unit.

7. A vehicle seat as claimed in claim 5, wherein a cylinder axis of the protuberance is in alignment with the pivot axis.

8. A vehicle seat as claimed in claim 1, wherein:
   the table spring is bent approximately in a U-shape and has a central leg and two side legs with spring ends additionally bent outward; and
   the spring ends engage into engagement openings of the table spring sleeves.

9. A vehicle seat as claimed in claim 1, wherein the backrest faceplate is composed of plastic.

10. A vehicle seat as claimed in claim 1, wherein the table unit comprises:
    a table faceplate; and
    a table panel joined together with the table faceplate in a positively locking fashion.

11. A vehicle seat as claimed in claim 1, wherein:
    a locking button is attached to the backrest faceplate;
    the locking button holds the table unit on the backrest faceplate when the table unit is in the non-usage position.

* * * * *